United States Patent [19]

Marx

[11] 4,298,194
[45] Nov. 3, 1981

[54] GAS SPRING WITH IMPROVED TERMINAL CONNECTOR AND MOUNTING MEANS

[75] Inventor: Thomas O. Marx, Rockton, Ill.

[73] Assignee: Atwood Vacuum Machine Company, Rockton, Ill.

[21] Appl. No.: 137,746

[22] Filed: Apr. 7, 1980

[51] Int. Cl.³ .............................................. F16F 9/32
[52] U.S. Cl. .............................. 267/64.11; 200/61.62; 267/182
[58] Field of Search .............. 188/1 A, 1 R, 266, 267, 188/322; 200/61.53, 62, 61.7; 267/64 R, 65 R, 182; 280/707; 340/686

[56] References Cited

U.S. PATENT DOCUMENTS 3,919,509 11/1975 Schnitzius ........................ 200/61.62
4,108,423 8/1978 Skubal .............................. 267/64 R

*Primary Examiner*—Duane A. Reger

*Attorney, Agent, or Firm*—Leydig, Voit, Osann, Mayer & Holt, Ltd.

[57] ABSTRACT

An electrically conductive gas spring for use in opening and closing a hinged deck lid of an automotive vehicle and for transmitting electric current to current consuming devices on the deck lid by way of an electrical path which extends between terminal connectors at opposed ends of the spring. The terminal connectors each have integrally formed mounting apertures which are of smaller size than a respective terminal pin upon which the connector is mounted such that the connector tightly and securely engages the outer perimeter of the terminal pin in electrically conductive relation without the need for auxilary threaded fasteners or the like. In one embodiment, the terminal connectors further serve to secure end mounting fittings to the ends of the gas spring without additional fastening means.

13 Claims, 4 Drawing Figures

U.S. Patent     Nov. 3, 1981     4,298,194
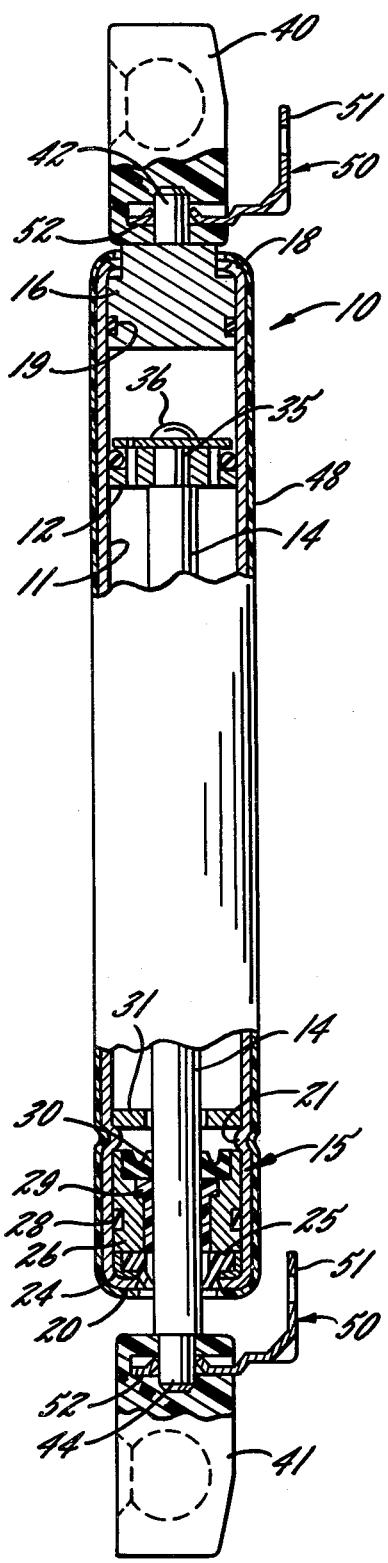
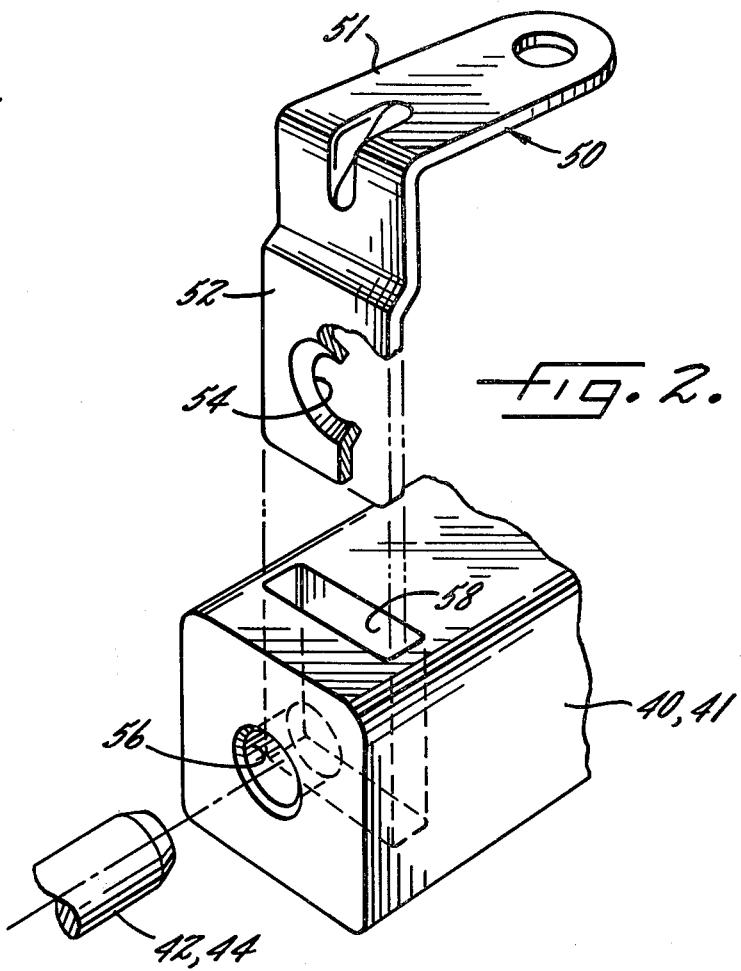
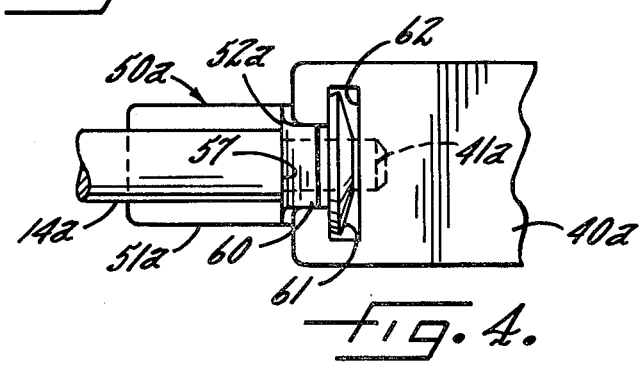

GAS SPRING WITH IMPROVED TERMINAL CONNECTOR AND MOUNTING MEANS

DESCRIPTION OF THE INVENTION

The present invention relates to gas springs of the type which provide an electrical path between a terminal connector secured to a closed end of the spring cylinder and a second terminal connector attached to the outer end of a gas spring plunger rod. The electrical path extends through the operating parts of the gas spring so that the spring, in effect, serves the additional function of providing an extendable electrical connection.

Such gas springs are commonly employed in the automotive industry for controlling the opening and closing hinged deck lids, such as hatchbacks, rear tail gates, and the like. Such tail gates and hatchbacks frequently have windows equipped with windshield wipers or built-in defrosting resistance elements. It is known in the art to utilize gas springs for electrically connecting such current consuming devices on the deck lid to conductors on the fixed portion of the vehicle body, in lieu of utilizing flexible connectors which are difficult to protect against damage. When utilizing such gas springs for electrical conduction, electrical terminal connectors commonly are secured to respective ends of the gas spring by axially clamping the connector into contact with other terminal parts of the spring by means of lock nuts or other threaded fastening means. After prolonged operation of a vehicle upon which such a gas spring is installed, however, vibrations often cause loosening of the threaded fasteners such that the electrical contact is interrupted, rendering inoperative the associated electrical device.

It is an object of the present invention to provide a gas cylinder with improved means for electrically connecting terminal connectors to the opposed ends of a gas spring cylinder and plunger rod.

Another object is to provide a gas spring as characterized above in which terminal connectors are secured in conductive relation to opposed ends of the gas spring without the necessity for lock nuts or other threaded fasteners which can become loosened and permit interruption of the electrical path through the gas spring.

A further object is to provide a gas spring of the above kind in which terminal connectors permit quick and easy assembly on the respective ends of the gas spring, serving the dual purpose of an electrical terminal and a means for securing and retaining the end assembly of the gas spring.

Other objects and advantages of the invention will become apparent upon reading the following detailed description and upon reference to the drawings in which:

FIG. 1 is a longitudinal sectional view of a gas spring with electrical terminal connector end assemblies embodying the invention;

FIG. 2 is an exploded perspective of an end of the gas spring shown in FIG. 1 with the terminal connector and associated end fitting disassembled from an end of the spring;

FIG. 3 is a fragmentary section of an alternative embodiment of gas spring terminal connector end assembly;

FIG. 4 is a bottom view of the end of the gas spring shown in FIG. 3.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to FIGS. 1 and 2 of the drawings, there is shown an illustrative gas spring 10 embodying the invention which may be utilized for lifting and holding a movable member, such as a hinged vehicle deck lid (not shown), in a predetermined open position. The spring 10 includes an elongated cylinder 11 enclosed at one end and a piston assembly 12 slidably disposed within the cylinder and carried on the end of a plunger rod 14 which is supported for reciprocating sliding movement in the other end of cylinder by a seal assembly 15. As is customary in gas springs, the cylinder is filled with a pressurized fluid which typically is a combination of oil and inert gas, such as nitrogen, under pressure.

For closing the upper end of the cylinder in this instance, a cylindrical plug 16 is force fit into the cylinder and is further held in place by an inturned flange 18 of the cylinder 11. To provide a seal between the plug 16 and cylinder wall, an "O" ring 19 is received in an annular groove formed about the outer periphery of the plug.

The seal assembly 15 at the opposite end of cylinder 11 is held in the cylinder between an inturned flange 20 formed in the end of the cylinder and a plurality of inwardly directed dimples 21 formed in the cylinder wall. The illustrated seal assembly 15 includes a relatively short L-shaped tube 24 having a radial flange immediately adjacent and abutting the cylinder end flange 20. An annular wiper 25 made of a resilient material, such as rubber, is seated in the tube 24 and engages the plunger rod 14 to wipe the latter as it is moved. Bearing against the wiper is a cylindrical member 26 with an annular outer groove which receives an "O" ring seal 28, and a sealing sleeve 29 is disposed between the member 26 and the rod 14. The innermost end of the cylindrical member 26 abuts the dimples 21 formed on the interior of the cylinder 11, and a cup-shaped annular seal 30 of resilient material, such as rubber, is located in a recess in the cylindrical member 26 and is in sealing engagement with the latter and the rod 14. In this instance, inwardly of the seal 15 is a rigid metal washer 31 disposed on the opposite side of the dimples 21.

The piston assembly 12 is seated on a reduced diameter end portion 35 of the plunger rod 14 and is maintained in place by a head 36 upset on the rod end. The piston assembly 15 may be of a conventional type, such as shown in Skubal, U.S. Pat. No. 4,108,423. In such a piston design, as the gas spring is expanded through outward extension of the plunger rod 14, such as occurs when opening a deck lid to which it is secured, the piston 12 causes a restricted flow of fluid within the cylinder, resulting in a dampening effect. When the plunger rod 14 is moved in an opposite direction to a retracted position in the cylinder shown in FIG. 1, such as when the deck lid is closed, the piston 12 permits the gas and oil to flow comparatively freely so there is virtually no dampening action as the spring is contracted.

In order to permit pivotal mounting of the gas spring 10 between its opposite ends, such as between the body of an automotive vehicle and a hinged deck lid, a ball joint end fitting or mounting member 40, preferably made of plastic, is provided at the closed end of the cylinder and a similar end fitting 41 is provided at the outermost end of the plunger rod 14. Integral with and projecting axially outwardly from the plug 16 at the closed end of the cylinder is a terminal pin 42 upon which the ball joint end fitting 40 is disposed. The end fitting 41 is similarly disposed on a reduced diameter end portion or terminal pin 44 of the plunger rod.

As will be understood by one skilled in the art, the components of the gas spring 10 may be utilized to provide an electrical path between the terminal pin 42 at the closed end of the cylinder and the terminal pin 44 at the outer end of the plunger rod during all conditions of expansion and contraction of the plunger rod. In the illustrated embodiment the electrical path extends from the plug 16, and through the cylinder 11, the piston assembly 12, and plunger rod 14. The exterior of the cylinder is covered with a layer 48 of electrically insulating material, such as a heat shrinkable thermoplastic material, and the parts of the sealing assembly 15 in this instance are constructed to electrically separate the cylinder 11 from the rod 14 at the sealing assembly, thus insuring that the electrical path extends from the cylinder to the rod through the piston assembly. For this purpose, the wiper 25 and annular seal 30 are made of rubber, the sealing sleeve 29 is made of comparatively rigid molded plastic, and the central hole in the washer 31 is large enough to permit free movement of the rod therethrough.

In accordance with the invention, a terminal connector is mounted on each terminal pin and includes integrally formed means for tightly engaging the outer periphery of the respective terminal pin in secure and reliable electrically conducting relation without the need for auxiliary fastening means. In the illustrated embodiment, a pair of identical terminal connectors 50 are provided at the respective ends of the gas spring. Each of the terminal connectors 50 is made of electrically conductive material and has a generally L-shaped configuration, having an outwardly extending flange 51 for attachment to appropriate wiring and a mounting flange 52 positioned on a respective terminal pin 42, 44. As best seen in FIG. 2, for securing each terminal connector 50 to its respective terminal pin 42, 44 in electrical conductive relation, the mounting flange 52 is formed with a mounting aperture 54 of lesser diameter than the terminal pin. To permit sufficient flexibility in the wall of the flange 52 about the periphery of the mounting aperture 54 for insertion of the larger terminal pin through the aperture, the flange 52 in this instance is relieved in conical fashion about the perimeter of the aperture 54 on the side of flange through which the terminal pin is inserted. It will be appreciated that with such a mounting arrangement, once a terminal pin 42, 44 is inserted through the aperture, it is not readily removable in the opposite direction. In other words, such a mounting aperture, in effect, serves as an integrally formed spring washer in the terminal connector which resists reverse movement on the pin. Such tight radial engagement of the terminal connector 50 about the periphery terminal pin insures reliable conductivity between the two terminal parts, as well as maintaining their secure engagement even under prolonged vibratory conditions as can exist in automotive installations.

In keeping with the invention, the terminal connectors 50 further serve to retain the associated end fittings or mounting members 40, 41 in mounted position on the respective pins 42, 44. To this end, the end fittings 40, 41 each are formed with a mounting aperture 56 which has a clearance fit with the respective terminal pin such that it is readily positionable on the pin, and the end fitting is further formed with a slot 58 transverse to the pin receiving aperture for receiving the terminal connector mounting flange 52. By first positioning the mounting flange 52 within the transverse slot 58 of the end fitting 40 and then inserting the terminal pin 42 into the mounting aperture 56 of the end fitting 40 and through the terminal connector mounting flange 52, the resulting engagement between the terminal pin and connector will captively retain the end fitting 40 in mounted position on the terminal pin without the necessity for auxiliary threaded fasteners. Moreover, it will be seen that upon installation of the gas spring 10 in a vehicle, the slot 58 will cause the terminal connector 50 disposed therein to be properly oriented with respect to the end fitting such that the outwardly extending flange 51 of the connector is in position for connection with the appropriate wiring. Since the end fittings 40, 41 preferably are made of plastic, they further serve to insulate the terminal pins and connectors from mounting parts that engage the end fittings upon installation of the gas spring.

Referring now to FIGS. 3 and 4, there is shown an alternative form of gas spring end assembly wherein parts similar to those described above have been given similar reference numerals with the distinguishing suffix "a" added. The end assembly in this case again includes an L-shaped terminal connector 50a and an end fitting mounting member 40a both positioned on a terminal pin 41a. The terminal connector 50a in this instance has a mounting flange 52a formed with a mounting aperture 54a defined by an integrally formed curved annular flange 60. The mounting aperture 54a again is slightly smaller than the diameter of the terminal pin 41a, and the annular flange 60 is turned in the direction in which the terminal pin is forced through the mounting aperture 54a, such that the flange will tightly engage the outer periphery of the terminal pin while tending to resist reverse movement of the pin. Because of the significant area of contact between the annular flange 60 and the periphery of the terminal pin 41a, it will be seen that such engagement provides good electrical contact between the two terminal members.

The terminal connector 50a in this case is mounted in abutting relation adjacent a shoulder formed in the terminal pin, such as the shoulder 57 defined by the reduced diameter terminal pin 41a of the plunger rod 14a, and the end fitting 40a is captively retained on the terminal pin 41a by a spring washer 61 which tightly engages the terminal pin and is disposed within a retaining slot 62 formed in the end fitting 40a. For properly orientating the terminal connector 50a relative to the end fitting 40a, the terminal connector mounting flange 52a is formed with an inturned lug 64 that is received in a groove recessed in the underside of the end fitting 40a, as viewed in FIGS. 3 and 4. The end fitting 40a is further formed with a recess for receiving the inturned annular flange 60 of the terminal connector.

From the foregoing, it can be seen that the gas spring of the present invention has terminal connector means which are secured at opposed ends of the gas spring in reliable electrically conductive relation without the need for auxiliary threaded fasteners or the like that can become loosened from vibrations experienced during use of the gas spring. Moreover, the terminal connectors not only serve to insure reliable electrical conductivity through the gas spring, but also provide a quick and easy means for securing end fitting mounting members to the ends of the gas spring for use in installation of the gas spring.

I claim my invention as follows:

1. An electrically conductive gas spring assembly comprising a fluid containing cylinder having closure means at one end thereof, a piston disposed for sliding reciprocating movement within said cylinder, an elongated plunger rod connected to said piston and projecting out the other end of said cylinder for reciprocating movement with said piston, sealing means in said other cylinder end for supporting said plunger rod for sliding reciprocating movement, a terminal pin extending outwardly from said closure means at said one cylinder end, a terminal pin at an outer projecting end of said rod, conductive means electrically connecting said terminal pins through said cylinder and rod, mounting means at said one cylinder end and at said projecting rod end for use in mounting said gas spring between said cylinder end and projecting rod end, a terminal connector mounted on each said terminal pin and having a lead connecting portion, said terminal connectors each having integrally formed means tightly engaging the outer periphery of a respective terminal pin in electrical conducting relation for completing an electrical path between the lead connecting portions of said terminal connectors.

2. The gas spring assembly of claim 1 in which said terminal connectors each have a mounting aperture of a smaller size than a respective terminal pin, and each said terminal pin is forcefully positioned through the mounting apertures of the respective terminal connector and retained therein.

3. The gas spring assembly of claim 2 in which said terminal connectors each have a mounting flange within which said which said mounting aperture is formed, and said mounting flange is relieved about the periphery of said aperture on the side of said flange through which said pin is positioned.

4. The gas spring assembly of claim 3 in which each said terminal connector mounting flange is formed with a conically shaped relieved area about the periphery of the aperture therein which facilitates positioning of the terminal pin through said aperture while resisting removal therefrom.

5. The gas spring assembly of claim 2 in which said terminal connectors each have a mounting flange in which said mounting aperture is formed, said mounting flange of each terminal connector being formed with a curved annular flange about the periphery of the aperture therein which tightly engages the respective terminal pin positioned therein.

6. The gas spring assembly of claim 5 in which said annular flange is curved axially in the direction in which the respective terminal pin is positioned through said aperture such as to facilitate insertion of the pin through said aperture while resisting removal.

7. The gas spring assembly of claim 5 in which each said mounting means is a plastic fitting formed with an aperture for receiving a respective one of said terminal pins, and spring clip means engaging said terminal pin for captively retaining said fitting on said terminal pin.

8. The gas spring assembly of claim 7 in which said spring clip means is received within a slot formed in the respective fitting.

9. The gas spring assembly of claim 7 in which each said terminal connector mounting flange is formed with a locating lug, and each said fitting is formed with a recess for receiving the locating lug of the respective terminal connector for retaining the connector in predetermined angular orientation relative to the fitting.

10. The gas spring assembly of claim 1 in which the mounting means at said one cylinder end and said plunger rod end each are positioned on a respective one of said terminal pins, and said terminal connectors retain said mounting means on the respective terminal pin.

11. An electrically conductive gas spring assembly comprising a fluid containing cylinder having closure means at one end thereof, a piston disposed for sliding reciprocating movement within said cylinder, an elongated plunger rod connected to said piston and projecting out the other end of said cylinder for reciprocating movement with said piston, sealing means in said other cylinder end for supporting said plunger rod for sliding reciprocating movement, a terminal pin extending outwardly from said closure means at said one cylinder end, a terminal pin at an outer projecting end of said rod, conductive means electrically connecting said terminal pins through said cylinder and rod, a mounting member disposed on each said terminal pin for use in mounting said gas spring between said cylinder end and projecting rod end, a terminal connector mounted on each said terminal pin and having a lead connecting portion, said terminal connectors each having integrally formed means tightly engaging the outer periphery of the respective terminal pin for completing an electrical path between the lead connecting portions of said terminal connector and for retaining said mounting member on the respective terminal pin without auxilary fastening means.

12. The gas spring assembly of claim 11 in which said terminal connectors each have a mounting flange formed with a mounting aperture of smaller size than the respective terminal pin, and said terminal pin is forcefully positioned through the mounting aperture of the respective terminal connector and retained therein.

13. The gas spring assembly of claim 12 in which each said mounting member is formed with an aperture for receiving a respective terminal pin and a slot formed transversely of the pin receiving aperture for receiving the terminal connector mounting flange whereby the mounting member is captively secured on said terminal pin upon engagement of the pin by said mounting flange.

* * * * *

UNITED STATES PATENT AND TRADEMARK OFFICE
CERTIFICATE OF CORRECTION

PATENT NO. : 4,298,194
DATED : November 3, 1981
INVENTOR(S) : Thomas O. Marx

It is certified that error appears in the above—identified patent and that said Letters Patent is hereby corrected as shown below:

Column 1, line 62, delete "diassembled" and insert -- disassembled --.

Column 5, line 41, delete "which said".

Signed and Sealed this

Sixteenth Day of February 1982

[SEAL]

Attest:

GERALD J. MOSSINGHOFF

*Attesting Officer*     *Commissioner of Patents and Trademarks*